(12) United States Patent
Vangemert

(10) Patent No.: US 8,786,403 B1
(45) Date of Patent: Jul. 22, 2014

(54) BIOMETRIC IDENTIFICATION SCANNER

(71) Applicant: Jeffery Robert Vangemert, Darrington, WA (US)

(72) Inventor: Jeffery Robert Vangemert, Darrington, WA (US)

(*) Notice: Subject to any disclaimer, the term of this patent is extended or adjusted under 35 U.S.C. 154(b) by 137 days.

(21) Appl. No.: 13/645,777

(22) Filed: Oct. 5, 2012

(51) Int. Cl.
*G05B 19/00* (2006.01)

(52) U.S. Cl.
USPC .......... 340/5.83; 382/124; 382/125; 382/126; 382/127

(58) Field of Classification Search
USPC ............. 340/5.83; 382/124, 125, 126, 127
See application file for complete search history.

(56) References Cited

U.S. PATENT DOCUMENTS

| | | | |
|---|---|---|---|
| D308,863 S | 6/1990 | Soren et al. | |
| 6,018,739 A | 1/2000 | McCoy et al. | |
| 6,282,303 B1* | 8/2001 | Brownlee | 382/124 |
| D478,905 S | 8/2003 | Byrne et al. | |
| D531,065 S | 10/2006 | Pira | |
| 7,308,122 B2* | 12/2007 | McClurg et al. | 382/124 |
| 7,689,006 B2 | 3/2010 | Govindaraju et al. | |
| 2003/0035568 A1* | 2/2003 | Mitev et al. | 382/124 |
| 2004/0101172 A1* | 5/2004 | Lane | 382/124 |
| 2009/0226051 A1* | 9/2009 | Hiraoka et al. | 382/124 |

* cited by examiner

*Primary Examiner* — Nabil Syed
*Assistant Examiner* — Adnan Aziz

(57) ABSTRACT

A biometric identification system effective for identifying individuals according to a combination of biometric records and predetermined finger stroke sequences. The system allows a user to easily access multiple bank accounts and multiple credit accounts in a secure manner. The user can decide which account to use for a purchase at the last minute. The system features a cleaning system for cleaning the fingerprint scanner after each use. The cleaning system is only accessible to qualified maintenance personnel.

11 Claims, 7 Drawing Sheets

(Cross-sectional view showing detail scanner as seen from the side)

(Cross-sectional view showing detail of scanner as seen from the side)

(Top View)

(Cross-sectional view showing detail of scanner as seen from the top)

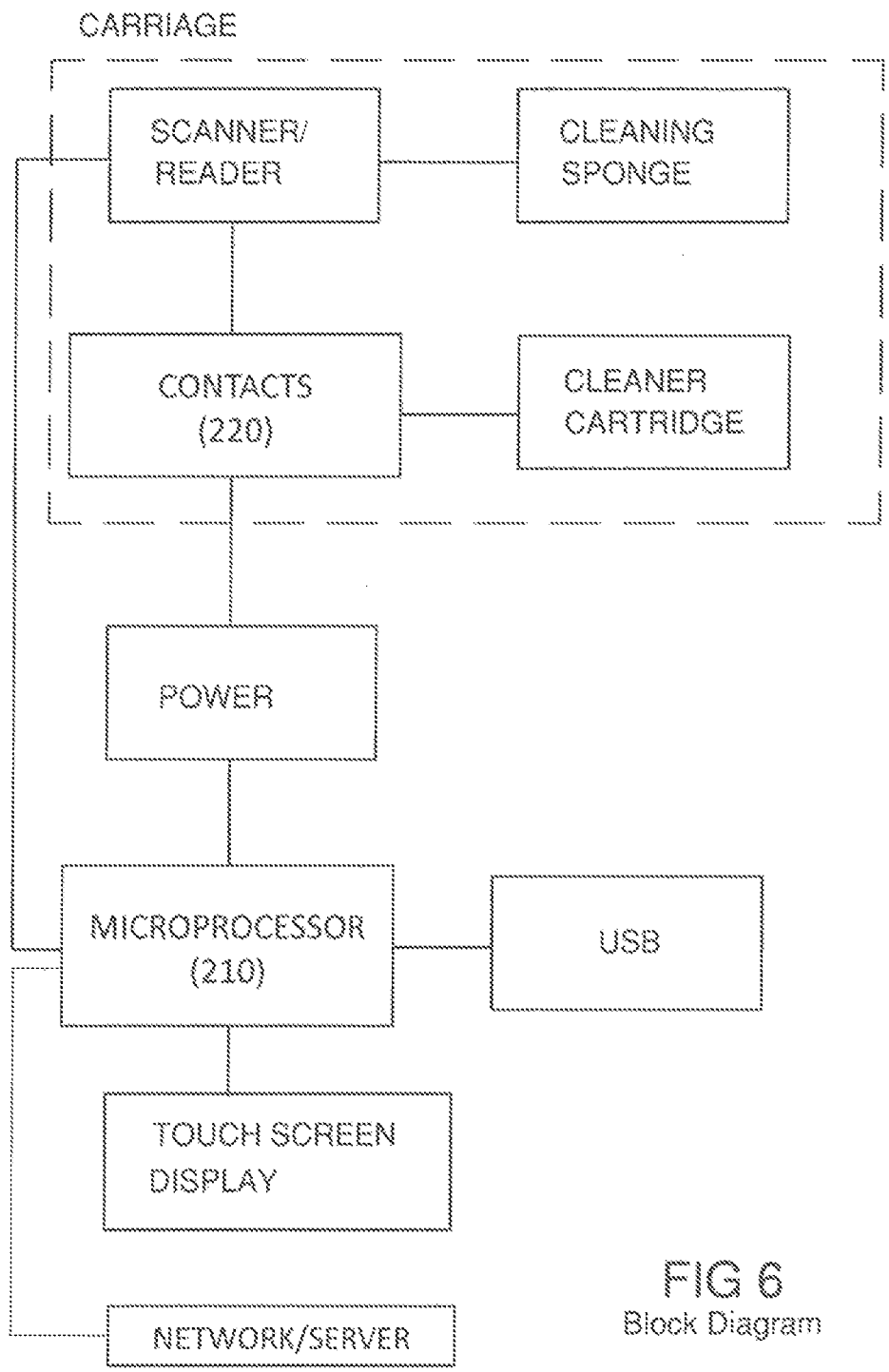

BIOMETRIC IDENTIFICATION SCANNER

BACKGROUND OF THE INVENTION

The present invention relates generally to identification systems, more particularly to distributed finger print and unique finger swipe sequence-based systems for identifying one or more persons.

Biometrics involves capturing a measurable characteristic of a human being for identification purposes. Distributed identification systems, particularly those based on the use of biometrics (e.g., fingerprint or photographs) may allow rapid and secure retrieval of a variety of different types of information. Biometric based systems are relied upon heavily in those industries which require heightened security measures, for example, in law enforcement, the military, the banking industry, etc.

The present invention features a biometric identification system effective for identifying individuals according to a combination of biometric records and predetermined finger stroke sequences. The system allows a user to easily access multiple bank accounts and/or multiple credit accounts in a secure manner (e.g., in a public place, without need of an assistant, etc.).

SUMMARY

The present invention features a biometric identification system (100) effective for identifying a user and linking said user to an account according to a combination of a biometric record and a predetermined finger stroke sequence. In some embodiments, the system (100) comprises a housing (110) having a first side (111), a second side (112), a scanning end (113), a top surface (115), and an inner cavity (118); (b) a microprocessor (210) disposed in the inner cavity of the housing (110); (c) a display (160) disposed on the top surface of the housing (110), the display comprises a touch screen display, the display (160) is operatively connected to the microprocessor (210); (d) a palm rest (150) disposed at the scanning end (113), the palm rest (150) extends inwardly toward the inner cavity (118) of the housing (110) and below the top surface (115) of the housing (110), forming a concave indentation in the scanning end (113) of the housing (110) when viewed from a side (111, 112); (e) a cylindrical fingerprint roller (180) disposed in the inner cavity (118) of the housing (110) extending from at or near the first side (111) of the housing (110) to at or near the second side (112) of the housing (110), a portion of the fingerprint roller (180) is accessible via a slot (158) in the scanning end (113) of the housing (110), the slot (158) is positioned at an inner end (151) of the palm rest (150), a remaining portion of the fingerprint roller (180) is hidden in the inner cavity (118) of the housing (110), the fingerprint roller (180) can rotate in at least a first direction about an axis extending from near the first side (111) of the housing (110) to near the second side (112) of the housing (110), the fingerprint roller (180) can move upwardly and downwardly with respect to the palm rest (150) between a released position and a pressed position, the fingerprint roller (180) is biased in the released position and is moved to the pressed position when a user pushes his/her fingers downwardly on the fingerprint roller (180) toward a bottom surface (116) of the housing (110); (f) a fingerprint scanner (190) disposed in the fingerprint roller (180), the fingerprint scanner (190) functions to detect fingerprints on the fingerprint roller (180), the fingerprint scanner (190) is operatively connected to the microprocessor (210); (g) a flange (115a) extending outwardly from the top surface (115) of the housing (110) a distance over the palm rest (150) of the housing (110) to create a hood to help shield the palm rest (150) and fingerprint roller (180) from onlookers; (h) a first half contact (220a) and a second half contact (220b) disposed in the inner cavity (118) of the housing (110), at least one contact (220) is operatively connected to the microprocessor (210), at least one contact (220) is operatively connected to the fingerprint scanner (190), the contacts (220) are separated when the fingerprint roller (180) is in the released position, when the fingerprint roller (180) is pressed to the pressed position the contacts (220) make contact and the fingerprint scanner (190) sends fingerprint data detected on the fingerprint roller (180) to the microprocessor (210); and (i) a cleaning system for cleaning fingerprints on the fingerprint roller (180), the cleaning system comprises (i) a cleaning cartridge (310) disposed in the inner cavity (118) of the housing (110), the cleaning cartridge (310) has a cleaning end (311) and an attachment end (312) and houses a cleaning solution; (ii) a sponge (320) disposed on the cleaning end (311) of the cleaning cartridge, the sponge (320) makes contact with a portion of the fingerprint roller (180) in the inner cavity (118), the sponge (320) transfers cleaning solution from the cleaning cartridge to the fingerprint roller (180); and (iii) a scrubber (330) disposed on the cleaning end (311) of the cleaning cartridge (310), the scrubber (330) makes contact with a portion of the fingerprint roller (180) in the inner cavity (118), the scrubber (330) comprises bristles or wipers (338) for cleaning the fingerprint roller (180).

When the system (100) is activated the display (160) prompts the user to place a fingerprint on the fingerprint roller (180), the fingerprint is registered as a first fingerprint signal, whereupon the fingerprint scanner (190) sends the first fingerprint signal to the microprocessor (210), the microprocessor communicates with a server and sends the first fingerprint signal to the server whereupon the server matches the first fingerprint signal to a user's identity. Subsequently the display (160) prompts the user to place a unique user-determined finger stroke sequence on the fingerprint roller (180), the unique user-determined finger stroke sequence is registered as a second fingerprint signal, whereupon the fingerprint scanner (190) sends the second fingerprint signal to the microprocessor (210), the microprocessor communicates with a server and sends the second fingerprint signal to the server whereupon the server matches the second fingerprint signal to a user's bank or credit account. After the system (100) matches the second fingerprint signal to a user's bank or credit account, the system (100) activates the cleaning system to clean the fingerprint roller (180).

In some embodiments, the display (160) is at an angle (101a) with respect to the top surface of the housing (110). In some embodiments, the first angle (101a) is between about 90 to 180 degrees.

In some embodiments, the fingerprint roller (180) is constructed from a material comprising glass. In some embodiments, the fingerprint roller (180) is mounted on mounting rollers (170), which help the fingerprint roller (180) rotate about its axis. In some embodiments, the fingerprint roller (180) is biased in the released position via a spring (188).

In some embodiments, the cleaning system or a portion thereof is removable. In some embodiments, the cleaning system or a portion thereof is removable via an access door (305) disposed in either the first side (111) or the second side (112) of the housing (110).

In some embodiments, the system (100) is in communication with a server via a wireless communication system. In some embodiments, the wireless communication system comprises a network, a wireless internet system, radio, Bluetooth®, or a combination thereof. In some embodiments, the unique user-determined finger stroke sequence comprises a sequence and orientation of finger strokes on the fingerprint roller (180).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 6 is a schematic view of the electrical components of the system of the present invention.

DESCRIPTION OF PREFERRED EMBODIMENTS

Figure 1:
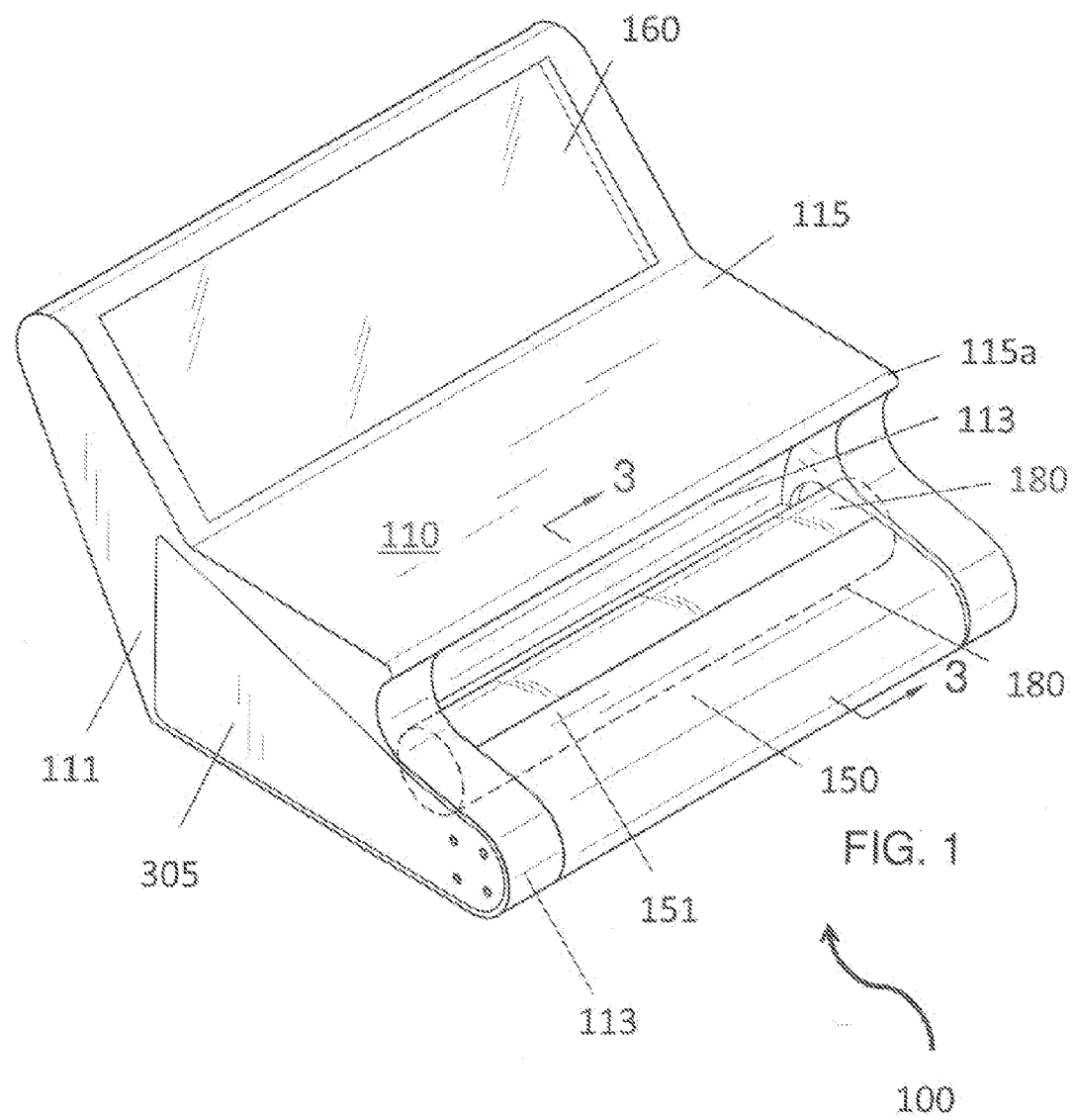
FIG. 1 is a perspective view of the system of the present invention.

Referring now to FIG. 1-6, the present invention features a biometric identification system (100) effective for identifying individuals according to a combination of biometric records and predetermined finger stroke sequences.

The system (100) comprises a housing (110), which houses a touch screen display (160), a fingerprint roller (180), a microprocessor (210), and a cleaning system for cleaning the fingerprint roller (180). Touch screen displays are well known to one of ordinary skill in the art and are commonly found on mobile phones and tablets. Touch screen displays often feature touchable keypads, buttons, and the like.

The housing (110) has a first side (111), a second side (112), a front end (a scanning end (113)), a top surface (115), a bottom surface (116) and an inner cavity (118).

The display (160) is disposed on the top surface (115) of the housing (110). The display (160) is operatively connected to the microprocessor (210). In some embodiments, the display (160) extends upwardly from the top surface (115) of the housing (110). In some embodiments, the display (160) is at an angle (e.g., a first angle (101a)) with respect to the top surface of the housing (110) as shown in FIG. 1. In some embodiments, the first angle (101a) is between about 90 to 180 degrees. In some embodiments, the first angle (101a) is between about 100 to 170 degrees. In some embodiments, the first angle (101a) is between about 110 to 160 degrees. In some embodiments, the first angle (101a) is between about 110 to 150 degrees. The first angle (101a) is not limited to the aforementioned degrees.

Figure 2:
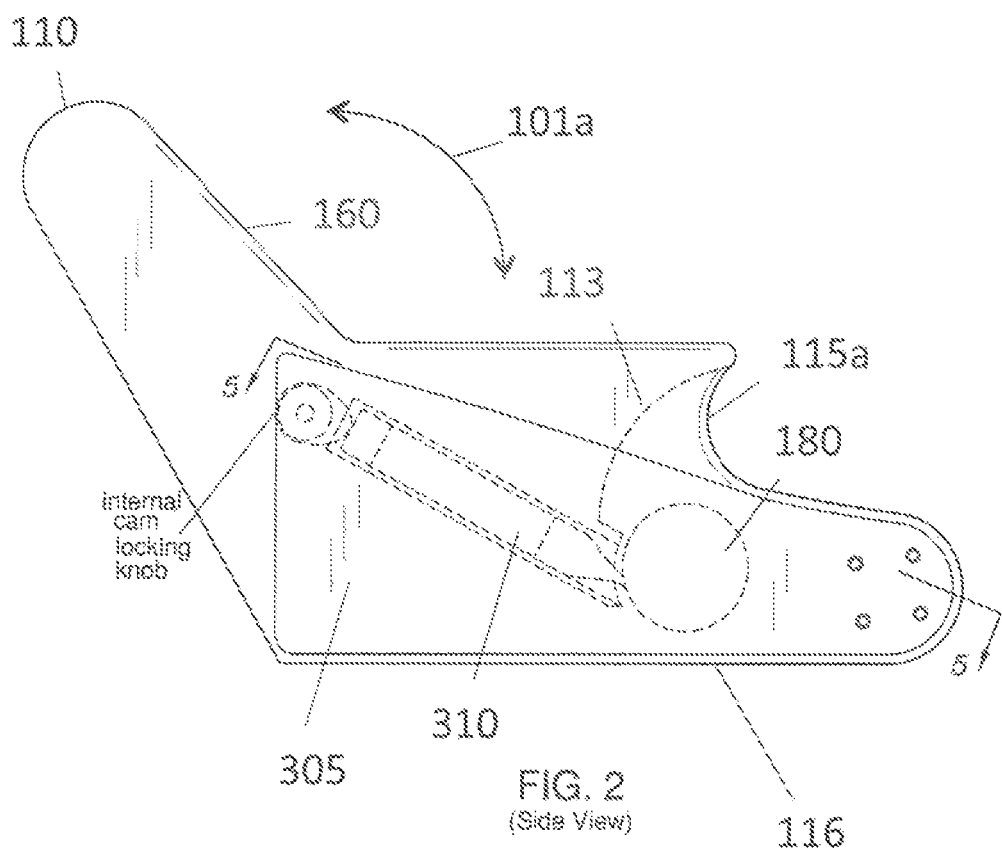
FIG. 2 is a side view of the system of the present invention.

As shown in FIG. 1 and FIG. 2, the scanning end (113) of the housing (110) is positioned at the front of the housing (110) with respect to the display (160). A palm rest (150) is disposed at the front end of the housing (110). The palm rest (150) extends inwardly toward the inner cavity (118) of the housing (110) and below the top surface (115) of the housing (110), forming a concave indentation in the scanning end (113) of the housing (110) when viewed from the side (see FIG. 2).

The fingerprint roller (180), e.g., a cylinder, is disposed in the inner cavity (118) of the housing, wherein a portion of the fingerprint roller (180) is accessible at the inner end (151) of the palm rest (150). In some embodiments, the fingerprint roller (180) is a cylinder extending from at or near the first end (111) of the housing (110) to at or near the second end (112) of the housing (110). Only a portion of the outer surface of the fingerprint roller (180) is accessible, while the remaining portion is housed in the inner cavity (118) of the housing (110).

The fingerprint roller (180) is a cylinder. The fingerprint roller (180) can rotate in at least a first direction about its axis, e.g., the axis extending from the first side (111) of the housing (110) to the second side (112) of the housing (110). In some embodiments, the fingerprint roller (180) is constructed from a material comprising glass, however the fingerprint roller (180) is not limited to glass.

Figure 3:
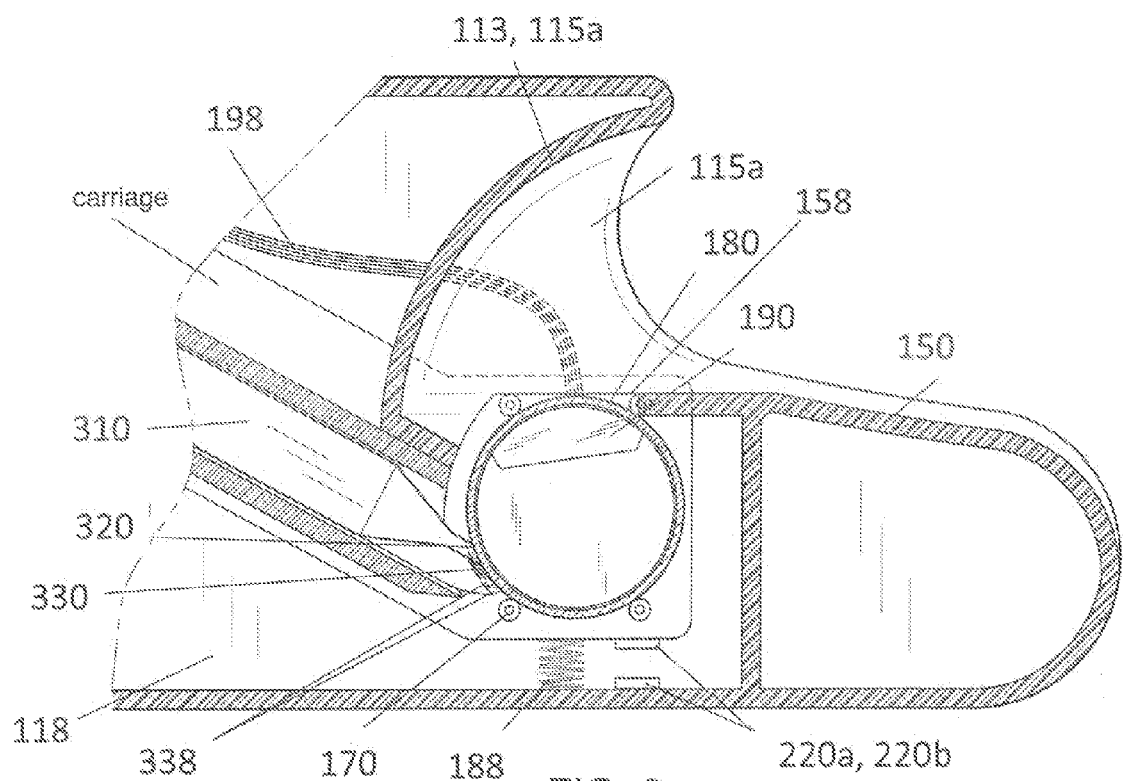
FIG. 3 is a side cross sectional view of the system of the present invention.

In some embodiments, the fingerprint roller (180) is mounted on (or within) mounting rollers (170) as shown in FIG. 3. In some embodiments, the mounting roller (170) function to rotate the fingerprint roller (180), e.g., after a transaction has been completed (e.g., to initiate the cleaning process as described below). As shown in FIG. 3, in some embodiments, the fingerprint roller (180) is mounted atop a pair of lower mounting rollers. In some embodiments, an additional mounting roller is disposed underneath the palm rest (150). In some embodiments, one or more of the mounting rollers is operatively connected or comprises a motor or other appropriate means of causing rotation of the mounting roller (170). In some embodiments, such motor is operatively connected to the microprocessor (210).

Figure 3A:
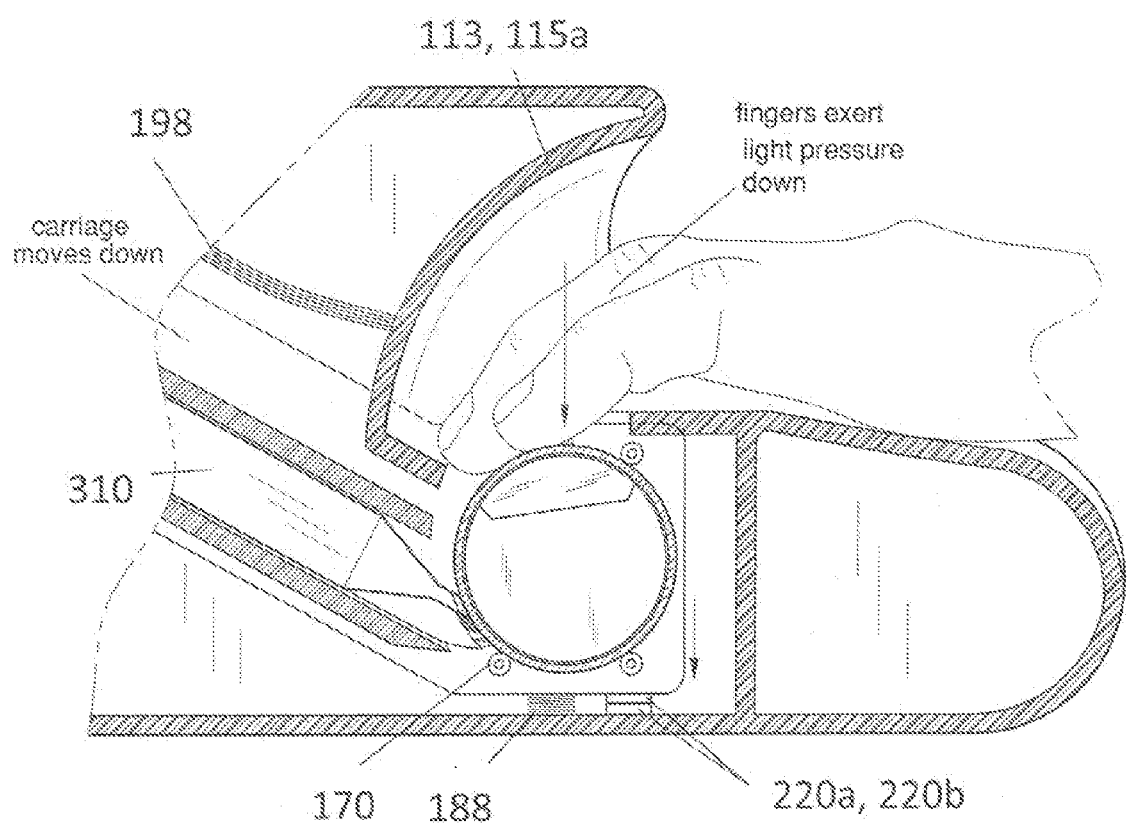
FIG. 3A is a side cross sectional view of the system of the present invention.
Figure 4:
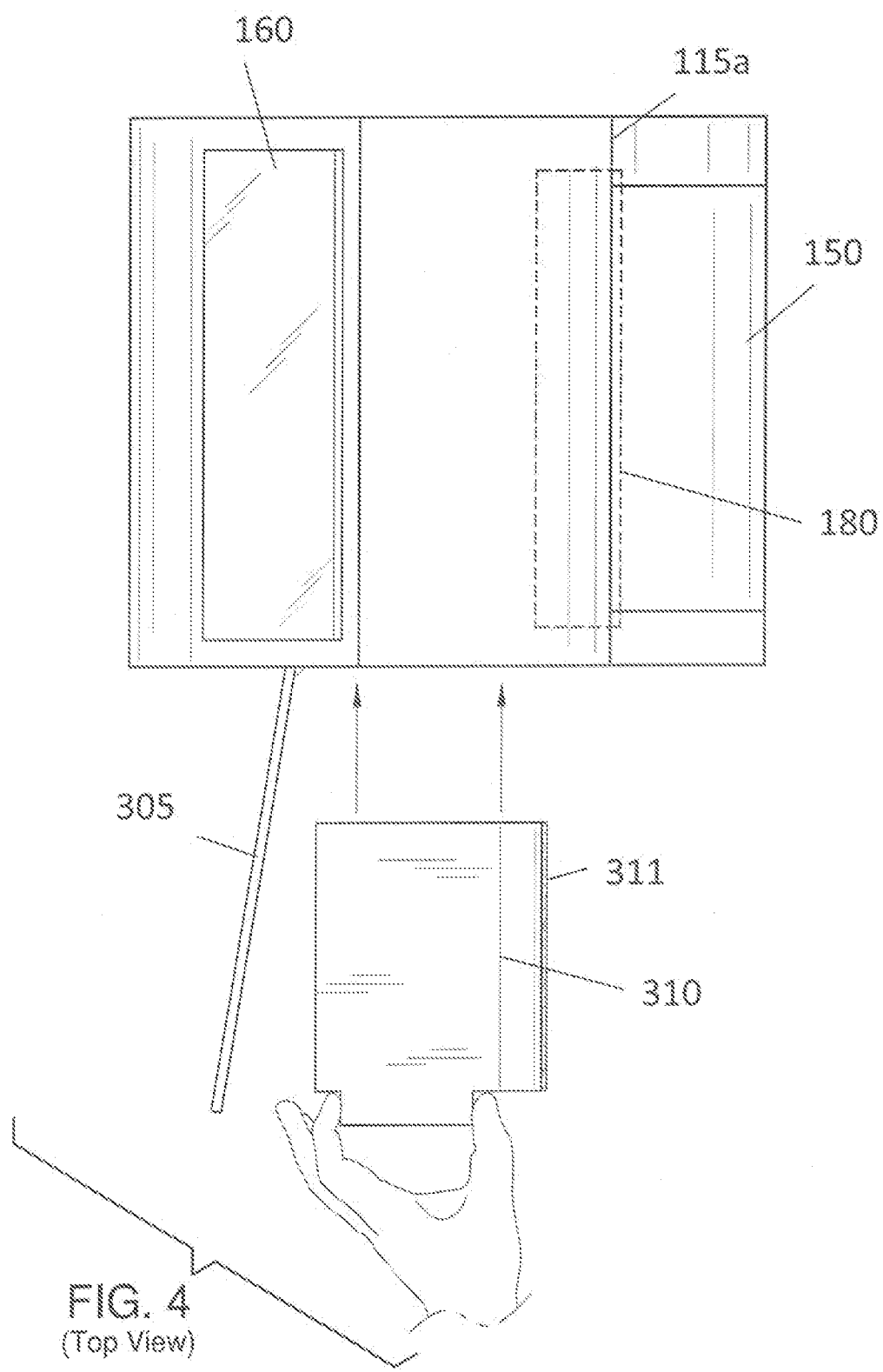
FIG. 4 is a top view of the system of the present invention.
Figure 5:
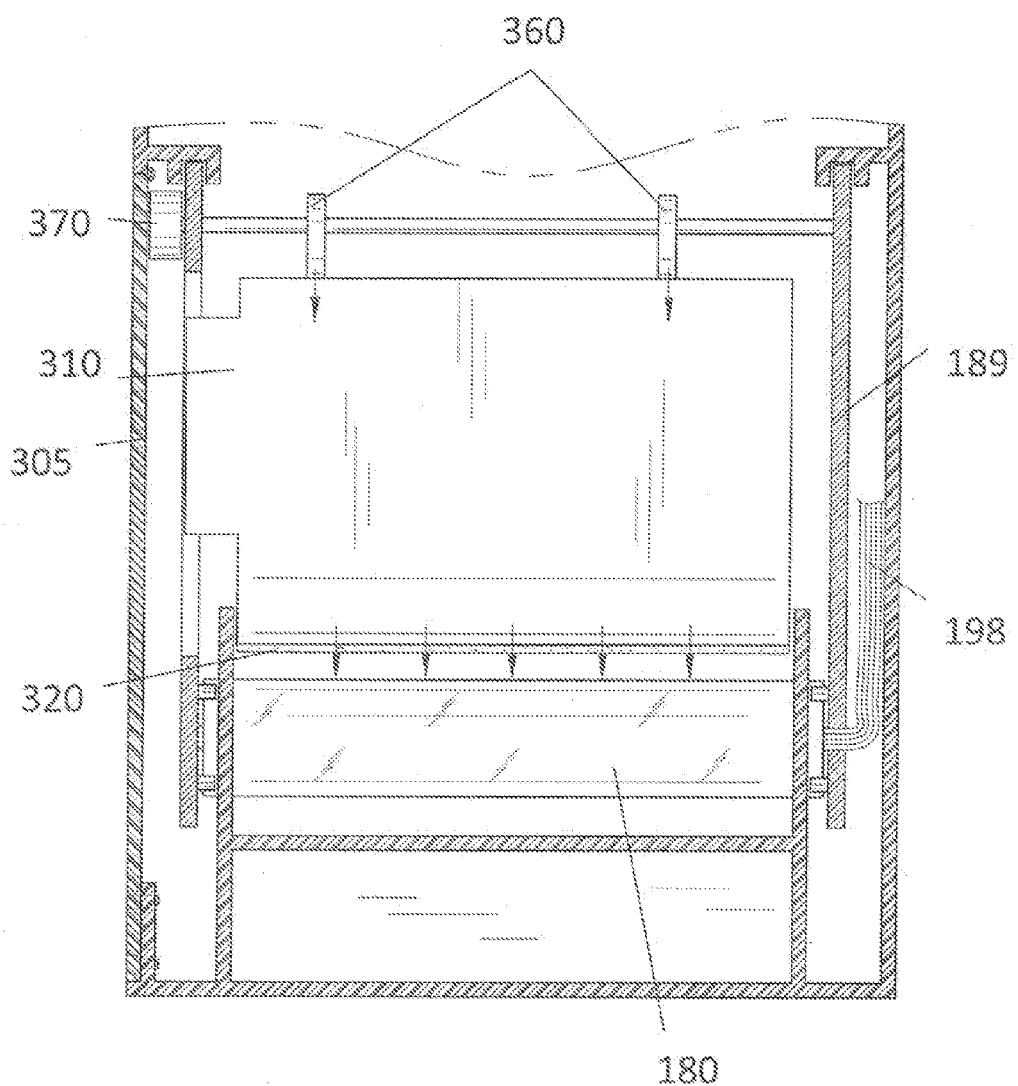
FIG. 5 is a cross sectional view of the system of the present invention.

As shown in FIG. 3 and FIG. 3A, a fingerprint scanner (190) is disposed in the fingerprint roller (180). The fingerprint scanner (190) is mounted to the housing (110), e.g., to the first side (111) and/or second side (112) of the housing (110). The fingerprint scanner (190) may remain stationary while the fingerprint roller (180) rotates. The fingerprint scanner (190) functions to detect fingerprints, e.g., combination of fingerprints. Fingerprint scanners are well known to one of ordinary skill in the art. The fingerprint scanner (190) can detect fingerprints when a user places his/her fingertips on the fingerprint roller (180). The fingerprint scanner (190) is operatively connected to the microprocessor (210) via a wire (198).

A flange (115a) extends outwardly from the top surface (115) of the housing (110) a distance over the palm rest (150) of the housing (110). This creates a hood to help shield the palm rest (150) and fingerprint relief (180) from onlookers. The flange (115a) ("hood") extends downwardly toward the fingerprint roller (180) and forms a part of the scanning end (113) of the housing (110). The flange (115a) ("hood"), in combination with the palm rest (150), helps to limit the amount of the fingerprint roller (180) that is accessible.

The fingerprint roller (180) can move upwardly and downwardly with respect to the palm rest (150). For example, the fingerprint roller (180) can move between a released position and a pressed position when a user presses his/her fingers downwardly toward the bottom surface (116) of the housing (110), pushing the fingerprint roller (180) downwardly as well. The fingerprint roller (180) is biased in the released position caused by a spring (188) (see FIG. 3 and FIG. 3A wherein FIG. 3 shows the released position and FIG. 3A shows the pressed position). In some embodiments, the fingerprint roller (180) is mounted to a carriage (189), which is mounted in the inner cavity of the housing (110).

The system (100) further comprises a first half contact (220a) and a second half contact (220b) disposed in the inner cavity (118) of the housing (110). When the contacts (220) are in contact, they provide a signal to the microprocessor (210) (at least one of the contacts (220) is operatively connected to the microprocessor (210). As shown in FIG. 3 and FIG. 3A, the contacts (220) are separated when the fingerprint roller (180) is in the released position. When the fingerprint roller (180) is pressed to the pressed position, the contacts (220) make contact. In some embodiments, the first half contact (220a) is disposed on the inner surface (within the inner cavity (118)) of the bottom surface (116) of the housing (110), and the second half contact (220b) is operatively connected to the fingerprint roller (180) such that when the roller (180) is moved to the pressed position the second half contact (220b) moves with the roller (180) toward the first half contact (220a).

The system (100) of the present invention further comprises a removable cleaning system for cleaning the fingerprints that are left on the fingerprint roller (180). The cleaning system may be removed by opening an access door (305) disposed in either the first side (111) or the second side (112) of the housing (110). The access door (305) can move between at least an open position and a closed position respectively allowing and preventing access to the inner cavity (118) and the cleaning system (100).

As shown in FIG. 2, the cleaning system comprises a cleaning cartridge (310) disposed in the inner cavity (118) of the housing (110). The cleaning cartridge (310) has a cleaning end (311) and an attachment end (312). The cleaning end (311) and the components thereon make contact with the fingerprint roller (180), e.g., the portion of the fingerprint roller (180) that is hidden in the inner cavity (118).

As shown in FIG. 3, a sponge (320) is disposed on the cleaning end (311) of the cleaning cartridge (310). The sponge (320) is in contact with the fingerprint roller (180), e.g., the portion of the fingerprint roller (180) that is hidden in the inner cavity (118). In some embodiments, the sponge (320) is saturated with a cleaning solution. In some embodiments, cleaning solution is housed in the cleaning cartridge and is absorbed by the sponge (320).

In some embodiments, a scrubber (330) is also disposed on the cleaning end (311) of the cartridge (310). The scrubber (330) is in contact with the fingerprint roller (180), e.g., the portion of the fingerprint roller (180) that is hidden in the inner cavity (118). The scrubber (330) may comprise bristles or wipers (338) for cleaning the surface of the fingerprint roller (180).

The cleaning system may be accessible only to qualified maintenance personnel. In some embodiments, the angle of the cleaning cartridge (as shown in the figures) allows fluid to transfer to the fingerprint roller (180). The scrubber (330) does not interfere with the placement of the fingers on the fingerprint roller (180) during a scan sequence.

In some embodiments, the cleaning cartridge (310), e.g., the attachment end (312), is mounted to cam tabs (360) within the inner cavity of the housing (110). In some embodiments, the cam tabs (360) are connected to a locking knob (370) and shaft.

The system (100) may be in communication with other wireless devices via a network, through wireless internet, blue tooth, radio, or any other appropriate system for sharing wireless means in order to share information.

In some embodiments, the system (100) is in communication with a server, e.g., via a network. Such communications are well known to one of ordinary skill in the art. In some embodiments, multiple systems (100) are in communication with each other via a network. Information may be shared, e.g., via a peer-to-peer network, a cloud computing system, or the like. In some embodiments, the network is a wired network or a wireless network.

In some embodiments, the microprocessor (210) is configured to execute a software application for identifying biometrics (e.g., biometric identities) and user-determined finger stroke sequences and transmitting said information to a server via a network. In some embodiments the microprocessor (210) is a multi-core processor or a digital signal-processing chip.

In some embodiments, the system (100) comprises a server remotely located apart from the system (100) or systems (100) and in communication with the microprocessors of each system (100) via the network. In some embodiments, the server is a business server, laptop, personal computer or other computer media configured to store, receive and send information about user fingerprint accounts and configured to execute the server-side software application.

In some embodiments, the system (100), e.g., the microprocessor (210), the memory, comprises a server-side identification software application for receiving and analyzing information received and creating and retrieving finger print data fifes corresponding with said information. In some embodiments, the system (100), e.g., the microprocessor (210), the memory, comprises a fingerprint database for storing the fingerprint data files.

The system (100) is configured to accept a user-determined finger stroke sequence to link the user to a bank or credit account and access the bank or credit account (e.g., for a purchase). The user-determined finger stroke sequence comprises a user-determined sequence of finger strokes entered to the fingerprint roller (180)/fingerprint scanner (190), e.g., within a predetermined time limit, for example between about 1 to 3 seconds, between about 1 to 5 seconds, between about 1 to 10 seconds, between about 1 to 30 seconds, etc. See Example 1 for information regarding user-determined finger stroke sequences and accessing of accounts.

EXAMPLE 1

Example 1 describes the use of an embodiment of the system of the present invention. The present invention is not limited to the described steps and system configurations.

In some embodiments, a user creates a biometric record (e.g., biometric identity) by pressing a finger onto the fingerprint roller (180) (fingerprint scanner (190)). The fingerprint scanner (190) reads the fingerprint information (e.g., a first fingerprint input signal) and sends the fingerprint information (e.g., a first fingerprint input signal) to the microprocessor (210). The microprocessor (210) transmits the fingerprint information (e.g., a first fingerprint input signal) to the server via the network.

In some embodiments, the user next creates a unique user-determined finger stroke sequence. The user-determined finger stroke sequence may comprise any user-determined sequence of finger swipes or strokes on the fingerprint scanner or placement/orientation of fingers on the fingerprint roller (180) (fingerprint scanner (190)) (e.g., within the predetermined time limit). For example, a user, when creating a user account, may choose to have a finger print sequence wherein the user places only his or her thumb and index fingerprints on the fingerprint roller (180) (fingerprint scanner (190)) (within the predetermined time frame). Thus, when the user later wishes to utilize his/her finger print sequence (e.g., when selecting a particular bank account), the user places only his or her thumb and index finger on the fingerprint roller (180) (fingerprint scanner (190)) (within the predetermined time frame). Once the user has created a unique user-determined finger stroke sequence, the fingerprint scanner (190) sends information about the user determined finger stroke sequence to the microprocessor (210). The microprocessor (210) transmits the same information to the server via the network.

The user, using the display, creates a record by entering bank or credit account information, which is linked to the user-determined finger stroke sequence and the biometric record (biometric identity). The account information is sent to the microprocessor (210). The microprocessor (210) transmits the same information to the server via the network.

When the user wishes to retrieve his/her account information, e.g., for a purchase, the user places his/her finger on the fingerprint roller (180) (fingerprint scanner (190)) to confirm his/her identity (biometric identity) and subsequently enters his/her user-determined finger stroke sequences (for the particular band or credit account) on the fingerprint roller (180) (fingerprint scanner (190)) (e.g., within the predetermined time limit). If the biometric identity and finger stroke sequence match, the account is used for the purchase.

After the purchase is complete, the fingerprint roller (180) of the system is then cleaned. In some embodiments, the cleaning solution is released from the cleaning cartridge (310) and is disposed on the fingerprint roller (180), e.g., via the sponge (320). In some embodiments, the scrubber (330) scrubs the fingerprint roller (180). The fingerprint roller (180) is cleaned for the next user.

As used herein, the term "about" refers to plus or minus 10% of the referenced number.

The disclosures of the following U.S. Patents are incorporated in their entirety by reference herein: U.S. Pat. No. 6,018, 739; U.S. Pat. No. 7,308,122; U.S. Pat. No. 7,689,006; U.S. Pat. Application No. 20004/0101172; U.S. Pat. Application No. 2009/0226051; U.S. Design Pat. No. D308,863; U.S. Design Pat. No. D478,905; U.S. Design Pat. No. D531,065.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A biometric identification system (100) effective for identifying a user and linking said user to an account according to a combination of a biometric record and a predetermined finger stroke sequence, said system (100) comprising:
  (a) a housing (110) having a first side (111), a second side (112), a scanning end (113), a top surface (115), and an inner cavity (118);
  (b) a microprocessor (210) disposed in the inner cavity of the housing (110);
  (c) a display (160) disposed on the top surface of the housing (110), the display comprises a touch screen display, the display (160) is operatively connected to the microprocessor (210);
  (d) a palm rest (150) disposed at the scanning end (113), the palm rest (150) extends inwardly toward the inner cavity (118) of the housing (110) and below the top surface (115) of the housing (110), forming a concave indentation in the scanning end (113) of the housing (110) when viewed from a side (111, 112);
  (e) a cylindrical fingerprint roller (180) disposed in the inner cavity (118) of the housing (110) extending from at or near the first side (111) of the housing (110) to at or near the second side (112) of the housing (110), a portion of the fingerprint roller (180) is accessible via a slot (158) in the scanning end (113) of the housing (110), the slot (158) is positioned at an inner end (151) of the palm rest (150), a remaining portion of the fingerprint roller (180) is hidden in the inner cavity (118) of the housing (110), the fingerprint roller (180) can rotate in at least a first direction about an axis extending from near the first side (111) of the housing (110) to near the second side (112) of the housing (110), the fingerprint roller (180) can move upwardly and downwardly with respect to the palm rest (150) between a released position and a pressed position, the fingerprint roller (180) is biased in the released position and is moved to the pressed position when a user pushes his/her fingers downwardly on the fingerprint roller (180) toward a bottom surface (116) of the housing (110);
  (f) a fingerprint scanner (190) disposed in the fingerprint roller (180), the fingerprint scanner (190) functions to detect fingerprints on the fingerprint roller (180), the fingerprint scanner (190) is operatively connected to the microprocessor (210);
  (g) a flange (115a) extending outwardly from the top surface (115) of the housing (110) a distance over the palm rest (150) of the housing (110) to create a hood to help shield the palm rest (150) and fingerprint roller (180) from onlookers;
  (h) a first half contact (220a) and a second half contact (220b) disposed in the inner cavity (118) of the housing (110), at least one contact (220) is operatively connected to the microprocessor (210), at least one contact (220) is operatively connected to the fingerprint scanner (190), the contacts (220) are separated when the fingerprint roller (180) is in the released position, when the fingerprint roller (180) is pressed to the pressed position the contacts (220) make contact and the fingerprint scanner (190) sends fingerprint data detected on the fingerprint roller (180) to the microprocessor (210); and
  (i) a cleaning system for cleaning fingerprints on the fingerprint roller (180), the cleaning system comprises (i) a cleaning cartridge (310) disposed in the inner cavity (118) of the housing (110), the cleaning cartridge (310) has a cleaning end (311) and an attachment end (312) and houses a cleaning solution; (ii) a sponge (320) disposed on the cleaning end (311) of the cleaning cartridge, the sponge (320) makes contact with a portion of the fingerprint roller (180) in the inner cavity (118), the sponge (320) transfers cleaning solution from the cleaning cartridge to the fingerprint roller (180); and (iii) a scrubber (330) disposed on the cleaning end (311) of the cleaning cartridge (310), the scrubber (330) makes contact with a portion of the fingerprint roller (180) in the inner cavity (118), the scrubber (330) comprises bristles or wipers (338) tor cleaning the fingerprint roller (180).

wherein when the system (100) is activated, the display (160) prompts the user to place a fingerprint on the fingerprint roller (180), the fingerprint is registered as a first fingerprint signal, whereupon the fingerprint scanner (190) sends the first fingerprint signal to the microprocessor (210), the microprocessor communicates with a server and sends the first fingerprint signal to the server, whereupon the server matches the first fingerprint signal to a user's identity;

subsequently the display (160) prompts the user to place a unique user-determined finger stroke sequence on the fingerprint roller (180), the unique user-determined finger stroke sequence is registered as a second fingerprint signal, whereupon the fingerprint scanner (190) sends the second fingerprint signal to the microprocessor (210), the microprocessor communicates with a server and sends the second fingerprint signal to the server, whereupon the server matches the second fingerprint signal to a user's bank or credit account;

wherein after the system (100) matches the second fingerprint signal to a user's bank or credit account, the system (100) activates the cleaning system to clean the fingerprint roller (180).

2. The system (100) of claim 1, wherein the display (160) is at an angle (101*a*) with respect to the top surface of the housing (110).

3. The system (100) of claim 2, wherein the angle (101*a*) is between about 90 to 180 degrees.

4. The system (100) of claim 1, wherein the fingerprint roller (180) is constructed from a material comprising glass.

5. The system (100) of claim 1, wherein the fingerprint roller (180) is mounted on mounting rollers (170), which help the fingerprint roller (180) rotate about its axis.

6. The system (100) of claim 1, wherein the fingerprint roller (180) is biased in the released position via a spring (188).

7. The system (100) of claim 1, wherein the cleaning system or a portion thereof is removable.

8. The system (100) of claim 7, wherein the cleaning system or a portion thereof is removable via an access door (305) disposed in either the first side (111) or the second side (112) of the housing (110).

9. The system (100) of claim 1, wherein the system (100) is in communication with a server via a wireless communication system.

10. The system (100) of claim 9, wherein the wireless communication system comprises a network, a wireless internet system, radio, Bluetooth®, or a combination thereof.

11. The system (100) of claim 1, wherein the unique user-determined finger stroke sequence comprises a sequence and orientation of finger strokes on the fingerprint roller (180).

* * * * *